(12) United States Patent
Hundsdorfer

(10) Patent No.: US 10,890,017 B2
(45) Date of Patent: Jan. 12, 2021

(54) MOTOR VEHICLE DOOR LOCKING SYSTEM

(71) Applicant: Kiekert AG, Heiligenhaus (DE)

(72) Inventor: Nikolaus Hundsdorfer, Ratingen (DE)

(73) Assignee: Kiekert AG, Heiligenhaus (DE)

( * ) Notice: Subject to any disclaimer, the term of this patent is extended or adjusted under 35 U.S.C. 154(b) by 465 days.

(21) Appl. No.: 15/311,538

(22) PCT Filed: May 13, 2015

(86) PCT No.: PCT/DE2015/100197
§ 371 (c)(1),
(2) Date: Jan. 26, 2017

(87) PCT Pub. No.: WO2015/172772
PCT Pub. Date: Nov. 19, 2015

(65) Prior Publication Data
US 2017/0152684 A1    Jun. 1, 2017

(30) Foreign Application Priority Data

May 16, 2014 (DE) .................. 10 2014 007 119
Feb. 5, 2015 (DE) .................. 10 2015 001 317

(51) Int. Cl.
*E05B 77/10*        (2014.01)
*E05B 85/02*        (2014.01)
(Continued)

(52) U.S. Cl.
CPC ............. *E05B 77/10* (2013.01); *B60J 5/0413* (2013.01); *B60J 5/0456* (2013.01); *E05B 85/02* (2013.01);
(Continued)

(58) Field of Classification Search
CPC ...... E05B 79/04; E05B 15/1635; E05B 85/02; E05B 17/0004; E05B 2015/1664;
(Continued)

(56) References Cited

U.S. PATENT DOCUMENTS 2,877,038 A * 3/1959 Kramer ................... E05B 83/16
                                                   292/216
3,316,007 A * 4/1967 Russell ................ E05B 15/0255
                                                  292/341.12
(Continued)

FOREIGN PATENT DOCUMENTS

DE       1 915 627      10/1970
DE      39 27 445 C2    2/1991
(Continued)

OTHER PUBLICATIONS

International Search Report and Written Opinion for corresponding Patent Application No. PCT/DE2015/100197 dated Sep. 9, 2015.

*Primary Examiner* — Kristina R Fulton
*Assistant Examiner* — Faria F Ahmad
(74) *Attorney, Agent, or Firm* — Renner, Otto, Boisselle & Sklar, LLP

(57) ABSTRACT

The invention relates to a motor vehicle door locking system, comprising a motor vehicle door lock (1) on a motor vehicle door (2) and a lock retainer (3), interacting therewith, on a motor vehicle body (4), or vice versa, according to patent application DE 10 2014 007 119.7, characterized in that a hold-back element (5) is provided which keeps clear an inlet opening (6) for the lock retainer (3) in the motor vehicle door lock (1) even in the event of deformations of the motor vehicle door (2) caused by an accident, wherein the hold-back element (5) keeps the opening clear on account of a shaping of the hold-back element.

17 Claims, 2 Drawing Sheets

Figure 1:
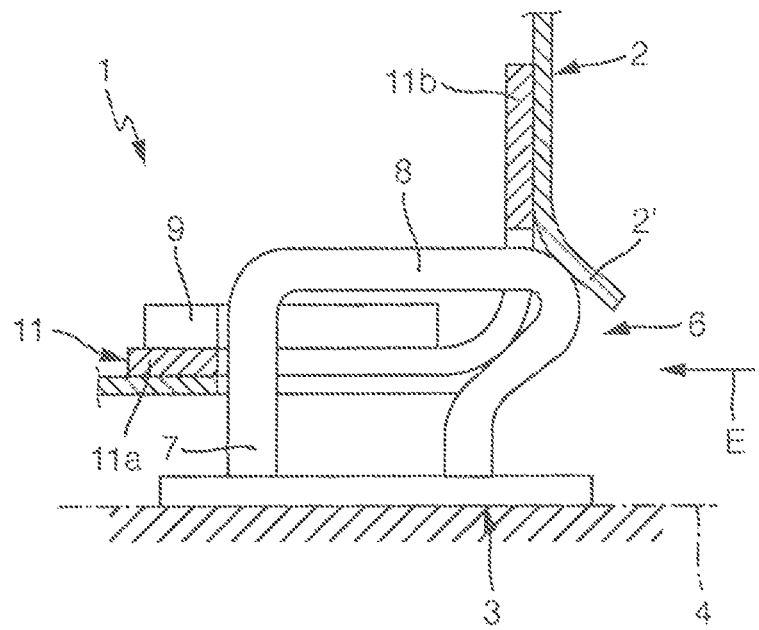

(51) Int. Cl.
*B60J 5/04* (2006.01)
*E05B 79/04* (2014.01)
*E05B 17/00* (2006.01)
*E05B 15/02* (2006.01)
*E05B 15/16* (2006.01)
*E05B 63/18* (2006.01)

(52) U.S. Cl.
CPC ....... *E05B 15/0255* (2013.01); *E05B 17/0004* (2013.01); *E05B 17/005* (2013.01); *E05B 63/18* (2013.01); *E05B 79/04* (2013.01); *E05B 2015/1664* (2013.01); *Y10S 292/23* (2013.01); *Y10S 292/65* (2013.01); *Y10T 292/108* (2015.04); *Y10T 292/1047* (2015.04); *Y10T 292/1082* (2015.04)

(58) Field of Classification Search
CPC ........ E05B 77/10; E05B 17/005; E05B 63/18; E05B 17/0041; E05B 77/42; E05B 15/0255; B60J 5/0413; B60J 5/0456; Y10S 292/23; Y10S 292/53; Y10S 292/54; Y10T 292/108; Y10T 292/1082; Y10T 292/1047; Y10T 292/79; Y10T 292/62; E05F 5/02
USPC .......... 292/200, 201, 216, DIG. 23, DIG. 53, 292/DIG. 54, 337, 346, DIG. 65, DIG. 41
See application file for complete search history.

(56) References Cited

U.S. PATENT DOCUMENTS

| | | | | |
|---|---|---|---|---|
| 4,027,432 A * | 6/1977 | Klebba | ............... | E05B 77/10 296/146.9 |
| 4,466,645 A * | 8/1984 | Kobayashi | ............ | E05B 85/045 292/216 |
| 4,580,823 A * | 4/1986 | Yamada | ................. | E05B 77/10 292/1 |
| 4,904,006 A * | 2/1990 | Hayakawa | ............. | E05B 81/06 292/201 |
| 5,382,062 A * | 1/1995 | Kostler | ................ | E05B 85/045 292/340 |
| 5,505,506 A * | 4/1996 | Kleefeldt | ................ | E05B 77/34 292/216 |
| 5,520,424 A * | 5/1996 | Hapke | .................... | D06F 37/42 292/198 |
| 5,678,869 A * | 10/1997 | Yoshikuwa | ............. | E05B 81/66 292/216 |
| 5,735,558 A * | 4/1998 | Watanabe | ............... | E05B 83/40 292/216 |
| 5,855,130 A * | 1/1999 | Rorabacher | ............. | E05B 77/34 292/201 |
| 5,899,508 A * | 5/1999 | Cetnar | .................... | E05B 81/16 292/216 |
| 5,961,163 A * | 10/1999 | Brackmann | ............. | E05B 81/06 292/201 |
| 6,014,876 A * | 1/2000 | Taylor | .................... | B60R 25/04 292/346 |
| 6,042,160 A * | 3/2000 | Hamada | .................. | E05B 83/16 292/216 |
| 6,053,542 A * | 4/2000 | Ostrowski | ............... | E05B 81/20 292/201 |
| 6,102,453 A * | 8/2000 | Cetnar | .................... | E05B 77/28 292/199 |
| 6,109,674 A * | 8/2000 | Bartel | ..................... | E05B 81/06 292/201 |
| 6,206,455 B1 * | 3/2001 | Faubert | ..................... | B60J 5/06 16/86 B |
| 6,428,063 B1 * | 8/2002 | Bland | ..................... | E05B 77/10 292/216 |
| 6,457,753 B1 * | 10/2002 | Wegge | ..................... | E05B 83/36 292/216 |
| 6,557,913 B1 * | 5/2003 | Kunst | ..................... | E05B 85/02 292/340 |
| 6,692,046 B2 * | 2/2004 | Paskonis | ................. | E05B 77/10 29/410 |
| 6,698,805 B2 * | 3/2004 | Erices | ..................... | E05B 77/04 292/201 |
| 6,733,052 B2 * | 5/2004 | Perkins | ................... | E05B 81/06 267/153 |
| 6,945,574 B2 * | 9/2005 | Hayakawa | .............. | E05B 81/06 292/201 |
| 6,951,355 B2 * | 10/2005 | Hayakawa | .............. | E05B 81/06 292/201 |
| 7,500,700 B2 * | 3/2009 | Kunst | ..................... | E05B 81/14 292/201 |
| 7,648,192 B2 * | 1/2010 | Herline | ................... | E05B 77/04 292/92 |
| 8,371,640 B2 * | 2/2013 | Horneck | ................... | B60J 5/06 296/146.6 |
| 9,140,037 B2 * | 9/2015 | Nagaoka | ............... | E05B 77/34 |
| 9,284,758 B2 * | 3/2016 | Yokomori | ............... | E05B 85/10 |
| 9,404,297 B2 * | 8/2016 | Bennett | ..................... | E05C 3/22 |
| 2014/0175813 A1 * | 6/2014 | Margheritti | ............. | E05B 77/34 292/201 |
| 2014/0203570 A1 * | 7/2014 | Nass | ....................... | E05B 79/20 292/196 |

FOREIGN PATENT DOCUMENTS

| | | |
|---|---|---|
| DE | 42 17 140 A1 | 11/1993 |
| DE | 698 14 727 T2 | 1/2004 |
| EP | 0 869 247 A1 | 10/1998 |
| EP | 1 582 660 A2 | 10/2005 |
| GB | 2235011 A | 2/1991 |
| GB | 2 382 839 A | 6/2003 |

* cited by examiner

State of the Art

MOTOR VEHICLE DOOR LOCKING SYSTEM

The invention relates to a motor vehicle door latch, with a motor vehicle door latch on a motor vehicle door and an interacting latch holder on a motor vehicle chassis, or vice versa, according to patent application DE 10 2014 007 119.7. This means that the motor vehicle door latch can in principle also be provided for on the motor vehicle chassis, whereby the latch holder is arranged on the motor vehicle door.

Motor vehicle door latches in the previously described form are used millions of times over and are discussed comprehensively in literature accordingly. Thus, the class-specific DE 39 27 445 C2 of the applicant deals with such a motor vehicle door latch, which deals inter alia with preventing movements of the motor vehicle door and associated bothersome noises. In addition, a locking effect should be provided, assisting in drive mode with regard to such dynamic stresses. For this purpose, a special locking mode is provided for which increases technological and mechanical effort.

In the also class-specific state of the art according to DE 1 915 627 the task has already been set of preventing deformities or a jamming of a forked latch caused by an accident as a component of a locking mechanism interacting with the latch holder. For this purpose, the known teaching finally proposes a niche, the wall of which forms an undercut entry slit for a closing block. A flange of the closing block is directly braced on a peripheral zone of the entry slit in the case of danger. Thus, in an accident a jamming of the catch inside the motor vehicle door latch is thus prevented. However, in addition to any deformities of the motor vehicle door latch, deformities of the motor vehicle door incorporating the motor vehicle door latch in particular must be taken into account.

In fact, it has been shown in practice with, for example, lateral impacts or so-called offset impacts, i.e. frontal impacts with off-center obstacles, that the motor vehicle door is considerably deformed and usually demonstrates a deformity in the direction of the latch holder. There is thus the risk that, for example, an internal door panel bearing the motor vehicle door latch reaches behind the latch holder or its latch holder bracket in the deformed state. However, this hooking behind of the internal door panel now leads to the motor vehicle door not or practically not being able to be opened by the emergency services after such a sequence of events in the accident.

Instead, special tools (so-called rescue cutters) are usually necessary for opening which are not available to laypersons or other parties involved in an accident and need to be laboriously brought to the accident site. Thus, life-saving treatment of the accident victims is often delayed. This is where the invention as a whole wishes to provide assistance.

The invention is based on the technical problem of further developing and improving such a motor vehicle door latch in such a way that in particular deformities of the motor vehicle door bearing the motor vehicle door latch do not or do not crucially hinder the functional capability of the motor vehicle door latch in the case of an accident.

In order to solve this technical problem, a class-specific motor vehicle door latch within the scope of the invention is characterized in that a mechanical retaining element is provided for which keeps an inlet opening free for the latch holder in the motor vehicle door latch even in the case of accident-induced deformities, whereby the opening is kept free by means of the retaining element by a shaping of the retaining element. The retaining element therefore ensures overall that the inlet opening for the latch holder in the motor vehicle door latch retains its original size and shape practically unchanged, even in the case of an accident. That is because the retaining element functions so to speak as a mechanical stop or mechanical lock for any deformities of the motor vehicle door. These deformities are consequently kept away from the inlet opening for the latch holder in the motor vehicle door latch. Advantageously, the shaping of the retaining element can also support a functional capability of the lateral door latch which is also necessary after an accident.

To this end, in detail the retaining element is mechanically designed in such a way that the material used is one in which a deformity is not or practically not observed even with occurring and attacking forces caused by an accident by a deformed door panel of the motor vehicle door, for example. This means that the strength of the material used for the retaining element must be considerably greater than the strength of the metal panel used for the motor vehicle door. In fact, high-strength steel with a minimum yield strength of greater than 350 $N/mm^2$ proved beneficial as a material for the retaining element, preferably with more than 500 $N/mm^2$, for example. In contrast, chassis panels and consequently also the door panel or internal door panel of the motor vehicle door demonstrate yield strengths in the range of approximately 200 to 250 $N/mm^2$.

In any case, the strength or yield strength of the material for the retaining element is at least 40%, especially 50% and more higher than that of the material for the motor vehicle door or the chassis panels used here. Added to this is the fact that the retaining element is not only designed from a certain material (high-strength steel), but is also braced on the motor vehicle door latch. Usually, the retaining element is connected to a latch plate inside the motor vehicle door latch. A single-component design of both the retaining element and the latch plate has proven especially beneficial. Because the latch plate is regularly also made of high-strength steel which demonstrates the previously described material characteristics. Finally, the retaining element and, if necessary, the single-component latch plate possess a material thickness which exceeds that of the motor vehicle door or the chassis panel by a multiple, for example twice as great or even more.

Thus, the retaining element can advantageously be molded out of the latch plate or molded to the latch plate. Due to the single-component design of both the retaining element and the latch plate for the retaining element and the latch plate, recourse can be had to a common steel plate with the described material characteristics (yield strength more than 350 N/mm2 and material thickness considerably greater than that of the chassis panel) from which both the latch plate and the shaped retaining element are formed. In fact, the retaining element is generally formed as a bracket exposed from the latch plate.

As usual, the purpose of the latch plate is to mount a locking mechanism interacting with the latch holder. The locking mechanism comprises a catch and a pawl retaining the catch. The catch interacts in the known manner with the latch holder or a locking bolt on the latch holder. Furthermore, the latch plate is usually L-shaped. In fact, the latch plate comprises a locking mechanism leg incorporating the locking mechanism and a mounting leg. The purpose of the mounting leg is ultimately (only) to connect the latch plate overall to a door panel or an internal door panel of the motor vehicle door. In contrast, the locking mechanism leg of the latch plate functions as a storage plate for the locking mechanism.

The retaining element is generally arranged at the edge of the inlet opening. Furthermore, the retaining element mainly extends parallel to the inlet direction of the latch holder into the inlet opening. It has stood the test overall when the retaining element extends in the opposite direction to the inlet direction of the latch holder into the motor vehicle door latch starting from the motor vehicle door latch. Thus, the retaining element is oriented to the outside of the door latch, so to speak. Thus, deformities observed of the internal door panel are effectively intercepted outside of the door latch.

Due to the edge-side arrangement of the retaining element in relation to the inlet opening and its design as a bracket exposed from the latch plate and the mainly parallel extension compared to the inlet direction of the latch holder it is ensured that deformities, in particular of the internal door panel of the motor vehicle door, cannot reach into the area of the inlet opening. Instead, the retaining element for such deformities functions as a stop, so to speak.

In other words, the internal door panel deformed during an accident is mounted in the direction of the inlet opening onto the retaining element. Other deformities of the relevant internal door panel in the case of such an accident scenario now lead to the retaining element being deformed because it is formed from a considerably stronger material with greater material strength. At the same time, the connection of the retaining element to the also robustly designed latch holder plate ensures that the internal door panel in the portrayed example follows the course of the retaining element and does not expand or cannot expand into the area of the inlet opening for the latch holder in any case. Thus, the inlet opening for the latch holder in the motor vehicle door latch is kept free in such accident-induced deformities of the motor vehicle door.

As a consequence hereof, even the deformed motor vehicle door can be opened in principle because the hooking observed in the state of the art and in practice between the internal door panel and the latch holder does not or practically does not occur. Thus, the access to the vehicle and any injured persons is simplified and can also be managed in principle by laypeople without special tools. A considerable safety benefit results overall and accident damage is considerably minimized compared to the state of the art. These are the crucial advantages.

In one design of the invention, the retaining element is bent away in the direction of the inlet opening and preferably has an angle greater than 90°, starting from the inlet opening. The inlet opening is arranged opposite the latch holder in relation to the latch holder or the latch holder bracket. Consequently, the latch holder can engage into the motor vehicle door latch, if for example a motor vehicle door latch carrying the lateral door is closed. Usually, the side door demonstrates an opening which leaves free the inlet area of the motor vehicle latch and is visible for an operator of the motor vehicle. The retaining element juts out of the opening of the side door, whereby the retaining element juts out of the part of the side door which is opposite the mounting surface of the latch holder. The mounting surface of the latch holder and the opening in the side door can preferably be arranged in parallel.

The retaining element juts so far out of the opening that the panel of the side door remains behind the external end of the retaining element. The retaining element can be formed at a right angle to the opening in the side door and/or at a right angle to the inlet opening in the motor vehicle door latch. An advantage results when the retaining element is bent over the right angle, i.e. is more than 90°. With such a design of the retaining element, the panel of the side door is clamped and held behind the retaining element, so to speak.

A further advantageous design results when the retaining element has a groove, whereby the groove is inserted in the direction of the side of the retaining element opposite the inlet opening. Due to the design of a groove in the retaining element the panel can be incorporated in an interlocking manner. In particular, targeted guidance of the panel is enabled. Consequently, the door panel can be moved away from the inlet opening if the door is deformed in the event of an accident.

Figure 2:
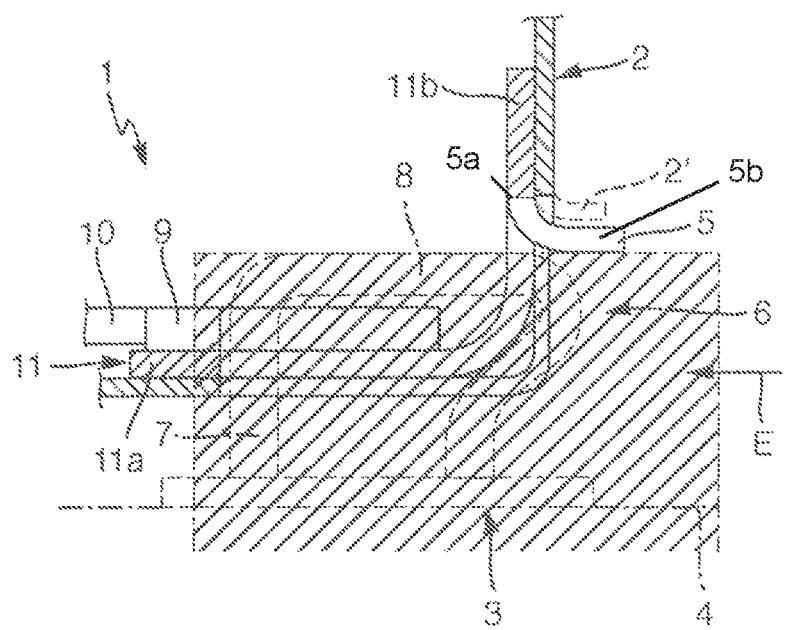
Figure 3:
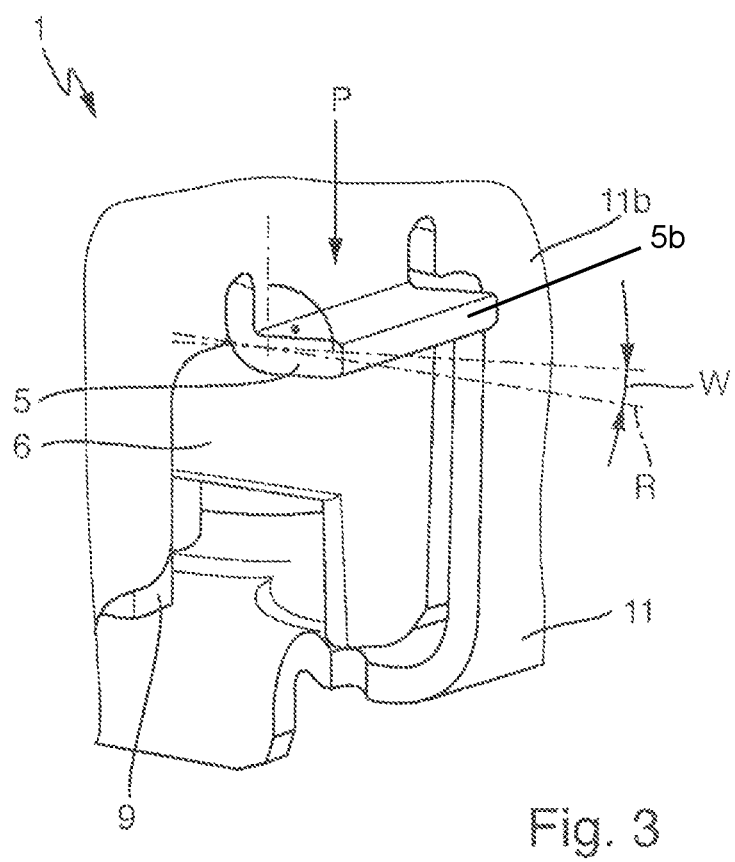
Figure 4:
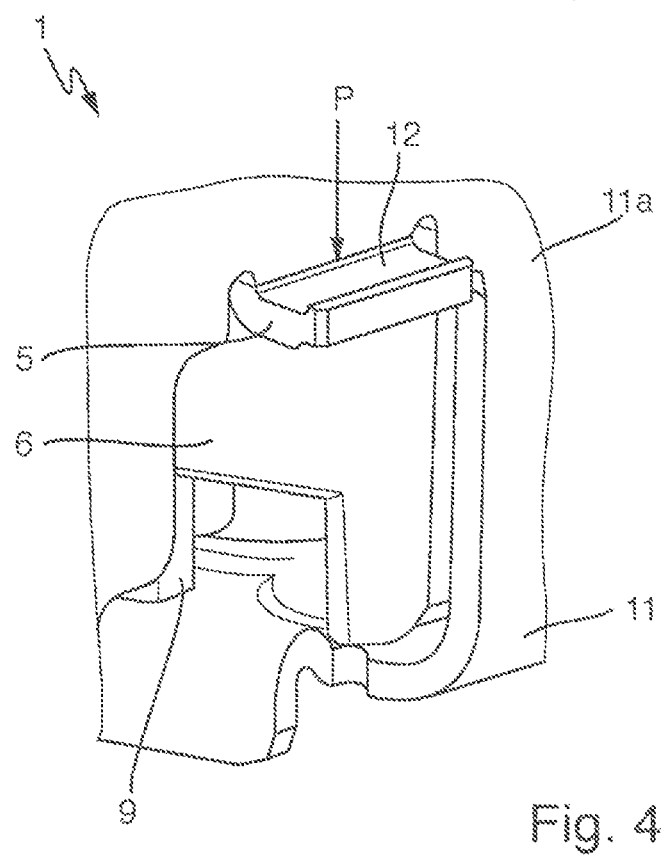

Hereinafter, the invention is explained in further detail on the basis of a sketch which only depicts one execution example. It shows:

FIG. 1 a motor vehicle door latch according to the state of the art with a motor vehicle door deformed by an accident, FIG. 2 the motor vehicle door latch according to the invention in a comparable functional position, FIG. 3 a three-dimensional view onto an inlet area of a motor vehicle door latch with a retaining element bent by more than 90° and FIG. 4 a three-dimensional view onto an inlet area of a motor vehicle door lath with a retaining element equipped with a groove.

In the figures, a motor vehicle door latch is depicted which is equipped in principle with a motor vehicle door latch 1 on a motor vehicle door 2 and an interacting latch holder 3 on a motor vehicle chassis 4. In principle, the procedure can also take place vice versa, i.e. the motor vehicle door latch 1 is attached to the motor vehicle chassis 4, whereas the latch holder 3 is located in or on the motor vehicle door 2. However, this variant is not depicted.

In the procedure according to the state of the art according to FIG. 1, it is shown that the motor vehicle door 2 is deformed by an accident. In fact, in the respective execution example only an internal door panel 2 of the motor vehicle door 2 is depicted which demonstrates deformities 2' caused by an accident. According to the state of the art, these deformities 2' on the latch holder 3 or its latch holder bracket can be adjacent or hooked behind the relevant latch holder bracket. Thus, the latch holder 3 in the state of the art is wedged overall according to FIG. 1 or clamped fast by the deformed motor vehicle door 2. As a consequence hereof, the motor vehicle door 2 cannot or practically cannot open, at least not without a special tool as described at the start.

In the solution according to the invention according to FIG. 2, however, a retaining element 5 is provided for which keeps an inlet opening 6 for the latch holder 3 in the motor vehicle door latch 1 free even with accident-induced deformities of the motor vehicle door 2 present. It is thus illustrated in FIG. 2 that in this case deformities 2' of the internal door panel 2 depicted with dashes are deflected or diverted from the retaining element 5. However, these deformities 2' can (no longer) reach the inlet opening 6 in the invention solution according to FIG. 2. The inlet opening 6 therefore fundamentally retains its size and shape even in the depicted accident scenario.

In order to attain this in detail, the retaining element 5 is arranged on the edge of the inlet opening 6 for the latch holder 3. In fact, the inlet opening 6 describes an overall dashed area in FIG. 2 which extends from the inside of the motor vehicle door latch 1 to the outside. This area illustrated in a cross-section in FIG. 2 and in practice extended in a cuboid shape spatially and lengthwise or the inlet opening 6 is ultimately described by the movement of the latch holder 3 relative to the motor vehicle door 2 and stretched.

In fact, when closing the motor vehicle door 2 in relation to the motor vehicle chassis 4 the latch holder 3 in the inlet direction E illustrated in FIG. 2 is moved opposite the motor vehicle door 2. Alternatively and preferably the motor vehicle door 2 is moved in relation to the latch holder 3, whereby the motor vehicle door 2, for example, is moved in the direction of the latch holder 3 during closure. Thus, a frontal locking bolt 7 as a component of the illustrated latch holder bracket 8 can interact with a locking mechanism 9, 10 inside the motor vehicle door latch 1. In order to open the motor vehicle door 2 the latch holder 3 moves in the reverse direction compared to the inlet direction E, which is of subordinate significance for the invention.

The locking mechanism comprises a catch 9 and an associated pawl 10. Hereby the locking bolt 7 engages into an inlet opening of the catch 9 which consequently rotates. Consequently, subsequently in conjunction with the pawl 10 different ratchet positions and in particular the main ratchet position are assumed with the motor vehicle door 2 completely closed opposite the motor vehicle chassis 4.

One recognizes that the retaining element 5 mainly extends parallel to the inlet direction E of the latch holder 3 into the inlet opening 6. Furthermore, the retaining element 5 is aligned in an opposite direction to the inlet direction E or extends contrary to the inlet direction E starting from the motor vehicle door latch 1.

The retaining element 5 is connected to a latch plate 11 inside the motor vehicle door latch 1. The latch plate 11 is L-shaped in the lateral view. In fact, the L-shaped latch plate 11 comprises a locking mechanism leg 11a pivotably receiving the locking mechanism 9, 10 and a mounting leg 11 connected to the internal door panel 2 of the motor vehicle door 2.

The retaining element 5 is not only connected to the relevant latch plate 11 inside the motor vehicle door latch 1, but the retaining element 5 and the latch plate 11 are formed as a single component. The retaining element 5 can be formed from the latch plate 11. In this case, the latch plate 11 and the retaining element 5 are formed commonly from a high-strength steel plate. In fact, the retaining element 5 is a bracket exposed from the latch plate 11 which retains the internal door panel 2 from the inlet opening 6 in the event of an accident as described. Overall, the mounting leg 11b of the L-shaped latch plate 11 is equipped with the relevant exposed bracket 5 having a first portion 5a that extends along the mounting leg 11b, and a second portion 5b that extends along an edge of the inlet opening 6.

In FIG. 3, a three-dimensional view is illustrated of a motor vehicle door latch 1 in the area of the inlet opening 6. The motor vehicle door latch is illustrated detached from the motor vehicle door 2, whereby a panel of the side door 2 would be pressed and deformed in the case of a lateral impact in the direction of the arrow P onto the bracket 5. A protrusion of the panel of the side door 2 over the area of the inlet opening 6 is prevented by the bracket 5.

A line R is aligned at a right angle to the mounting leg 11a. The bracket 5 is further bent around an angle W to the mounting leg 11a and consequently demonstrates an angle of over 90° to the inlet opening 6 in relation to the inlet opening. In the case of an accident, the panel of the side door 2 is deformed in the direction of the arrow P, whereby the panel encounters the bracket 5 and is retained by the bracket 5. The shaping of the bracket 5 is especially prevented by a pushing of the panel over the inlet area 6.

FIG. 4 also depicts a three-dimensional view of a motor vehicle door latch 1 in the area of the inlet opening 6, whereby the motor vehicle door latch 1 is also depicted detached from the motor vehicle door 2. The bracket 5 has a groove 12 which is molded into the bracket 5 on a side of the bracket 5 opposite the inlet area 6. If now in the case of accident a panel of the side door 2 is deformed or pushed in the direction of the arrow P, the groove 12 prevents the panel being pushed over the inlet opening 6. The inlet opening 6 is especially protected by the groove 12 as the side door panel is targetedly deformed. Due to the shaping of the groove 12 the panel can be wound up or impounded in the groove 12. Consequently, increased safety is guaranteed in relation to a perfect activation of the motor vehicle door latch also in extreme situations.

REFERENCE SIGN LIST

Motor vehicle door latch 1
Motor vehicle door, side door 2
Deformity 2'
Latch holder 3
Motor vehicle chassis 4
Retaining element, bracket 5
Inlet opening 6
Locking bolt 7
Latch holder bracket 8
Locking mechanism 9, 10
Latch plate 11
Locking mechanism leg 11a
Mounting leg 11b
Groove 12
Inlet direction E
Deformity direction P
Angle W

The invention claimed is:

1. A motor vehicle door latch on a motor vehicle door, the motor vehicle door latch comprising:
 a latch holder;
 an inlet opening;
 a latch plate having a mounting leg connected to an internal door panel of the motor vehicle door; and
 a retaining element that is connected to the latch plate and keeps the inlet opening for the latch holder in the motor vehicle door latch free during accident-induced deformities of the motor vehicle door, whereby the inlet opening is kept free using the retaining element by a shaping of the retaining element,
 wherein the retaining element has a first portion that extends along the mounting leg and a deflected portion that is deflected away from the mounting leg and under the internal door panel to extend along an edge of the inlet opening, wherein during an accident, the internal door panel is deflected along the deflected portion of the retaining element outside of the inlet opening, and wherein the deflected portion is angled relative to the first portion under the internal door panel by an angle that is greater than 90 degrees whereby the deflected portion is deflected relative to the first portion without a sharp corner.

2. The motor vehicle door latch according to claim 1, wherein the retaining element mainly extends in parallel to an inlet direction of the latch holder into the inlet opening.

3. The motor vehicle door latch according to claim 1, wherein the retaining element extends in an opposite direction to an inlet direction starting from the motor vehicle door latch.

4. The motor vehicle door latch according to claim 1, wherein the retaining element and the latch plate are formed as separate single components.

5. The motor vehicle door latch according to claim 1, wherein the retaining element is molded out of the latch plate or molded onto the latch plate.

6. The motor vehicle door latch according to claim 1, wherein the retaining element is formed as a bracket exposed from the latch plate.

7. The motor vehicle door latch according to claim 1, wherein the latch plate is formed in an L-shape with a locking mechanism leg receiving a locking mechanism.

8. The motor vehicle door latch according to claim 7, wherein the mounting leg is formed with the retaining element which is an exposed bracket.

9. The motor vehicle door latch according to claim 1, wherein the retaining element defines a groove, whereby the groove is inserted in a direction of a side of the retaining element opposite the inlet opening.

10. A motor vehicle door latch on a motor vehicle door, the motor vehicle door latch comprising:
    a latch holder;
    an inlet opening; and
    a retaining element which keeps the inlet opening for the latch holder in the motor vehicle door latch free during accident-induced deformities of the motor vehicle door, whereby the inlet opening is kept free using the retaining element by a shaping of the retaining element,
    wherein the retaining element defines a groove to prevent a panel of the motor vehicle door from being pushed over the inlet opening during deformation of the motor vehicle door, the groove being molded into a surface of the retaining element that is arranged in a side of the retaining element opposite the inlet opening and extends along a length of the retaining element.

11. The motor vehicle door latch according to claim 10, wherein the retaining element mainly extends in parallel to an inlet direction of the latch holder into the inlet opening.

12. The motor vehicle door latch according to claim 10, wherein the retaining element extends in an opposite direction to an inlet direction starting from the motor vehicle door latch.

13. The motor vehicle door latch according to claim 10, wherein the retaining element and the latch plate are formed as separate single components.

14. The motor vehicle door latch according to claim 10, wherein the retaining element is molded out of the latch plate or molded onto the latch plate.

15. The motor vehicle door latch according to claim 10, wherein the retaining element is formed as a bracket exposed from the latch plate.

16. The motor vehicle door latch according to claim 10, wherein the latch plate is formed in an L-shape with a locking mechanism leg receiving a locking mechanism.

17. The motor vehicle door latch according to claim 10, wherein the mounting leg is formed with the retaining element which is an exposed bracket.

* * * * *